3,476,575
WHITE TACKY SPRAY BOOTH COATING
Roger F. Arnold, Cincinnati, Ohio, assignor to W. R. Grace & Co., New York, N.Y., a corporation of Connecticut
No Drawing. Filed June 16, 1966, Ser. No. 557,897
Int. Cl. C09d 5/20; C08b 27/14
U.S. Cl. 106—2     7 Claims

ABSTRACT OF THE DISCLOSURE

The invention disclosed is directed to an aqueous emulsion composition formed of polymerized terpene hydrocarbons, lube oil, wax, cotton seed fatty acid and potassium or sodium hydroxide. The composition is particularly useful for forming a temporary coating on the dry inside surface of paint spray booths.

---

This invention relates to an aqueous emulsion of polymerized terpene hyrocarbons containing oil and wax that is particularly useful as a temporary coating for the dry inside surface of paint spray booths.

It has been necessary, especially in the automotive industry and the appliance industry to provide separate shelter areas when spray painting various objects such as auto body parts, appliances, sheet metal and other miscellaneous parts, called "spray booths."

When the article is sprayed with the paint or finish, a large quantity of paint is deposited upon the surfaces of the side, floor and ceiling. When this deposit has become of a certain thickness the spray booth then becomes a very serious fire hazard, and it is necessary to remove the accumulations.

It has been well known in the art for a number of years to coat the side of the spray booth with a preparation which will permit a quick and easy removal of the accumulations from the surfaces.

These coatings must provide the following properties:
(1) The material must be easily and quickly removable, carrying with it the accumulation of paint or finish.
(2) It must provide a tacky surface to cut excess paint and other airborne particles such as dust to eliminate rejects.
(3) It must possess a light reflective surface to afford the painter optimum visibility to apply paints especially metallic paints evenly and correctly.

To date, no product is available which combines all these properties.

In summary, my invention comprises an emulsion composition consisting essentially of 6-24% polymerized terpene hydrocarbon, 0-18% lube oil, and 3-7% wax, the emulsifying agent being a potassium soap of semidrying vegetable fatty acids. In a preferred embodiment my invention teaches the use of various additives, such as humectants, pigments, preservatives, antioxidants, and thickeners.

The polymerized terpene hydrocarbon is a light-colored, thermoplastic, terpene resin, having a softening point (measured by ASTM ring and ball method E28–51T) of about −10° C., and being a viscous liquid at room temperature. It is a mixture of alpha-pinene dimers and trimers. Such a polyterpene is readily available commercially. Its function is to provide tackiness, and promote solubility of the other wax and oil components by inhibiting wax crystallization in order to facilitate later water removal. Operably this polyterpene is present from 6–24 weight percent, and preferably from 8–15 weight percent.

The lube oil operable is any hydrocarbon oil available commercially, having a viscosity minimum of about 40 S.U.S. S.U.S. is the abbreviation for Saybolt Universal seconds, as measured on the Saybolt viscometer, using ASTM method D88–53. There is no necessary viscosity maximum, as long as the oil is still liquid, at room temperature, about 1,00 S.U.S. I have found that a lube oil of viscosity 100 S.U.S. is quite suitable. The operable range of lube oil in the composition is up to 18 weight percent, and preferably 9 to 14 weight percent. The thickness of the oil gives body to the finished emulsion product.

The hydrocarbon wax used is slack wax, a commercial by-product of petroleum distillation. This provides body and acts as a tacking agent, as well as increasing available use temperature. Operably amounts which can be used are 3–7 weight percent and preferably 4–6 weight percent.

Of course, it is obvious to one skilled in the art that petrolatum, also known as petroleum jelly, could be used in place of the lube oil and slack wax. Since the petrolatum is a semisolid hydrocarbon, the final composition would possess the same properties as if lube oil and wax were used. Operable amounts which can be used of petrolatum, are 1–25 weight percent and preferably 13–20 weight percent.

The emulsifying agent is a potassium or sodium salt of semidrying vegetable fatty acids. This is produced by adding the chosen fatty acid to the reaction mixture, then neutralizing with potassium or sodium hydroxide in a 46 weight percent aqueous solution to form a neutral soap. Other bases can operably be used for neutralization, such as various amines, such as t-butyl amine, n-propyl-amine, isoamyl amine, and others. The amines can either be liquid, in which case they are added directly to the reaction, or solid, in which case they can be added in aqueous solution or suspension.

The preferable semidrying vegetable fatty acid is cotton seed oil and cotton seed fatty acids, for use in the emulsifying agent. These oils are a semidrying vegetable oil composed of a mixture of long chain fatty acids. The saponification value is generally between 195 and 205 and the iodine value is between 100 and 115. Other semidrying vegetable fatty acids and oils can operably be used in the invention, notably sesame oil, corn oil, and soybean oil. All these oils contain a relatively high percentage of the doubly unsaturated acid, linoleic acid, and it will be evident to one skilled in the art that other semidrying vegetable fatty acids and oils can readily be used in this invention.

Operable weight percent of the acid used in the composition is 8–15, and the preferable value is 10–12 weight percent. The base is operably employed in 3–10 weight percent, preferably 4–6 weight percent. The final weight percent of the emulsifying soap can be as large as 25 or 30 weight percent, and as small as 5 weight percent.

The pigment added to the composition is white titanium dioxide, a commercial white paint pigment, although other white pigments can be used. This is employed at 3–10 weight percent operably, and preferably 4–6 weight percent.

In addition to these components, we may also and ordinarily do include other conventional ingredients for their usual effects including the following: antiforming agent, examples of which are tributyl citrate, pine oil, and dimethyl siloxane polymers; fillers and thickeners as, for instance, kaolin, china, or other nonswelling clay, diatomaceous earth; and cellulosic derivatives; water added as such in final compounding; a preservative that may be one of the usual preservatives for organic materials as, for example, phenol derivatives, cresol, chlorophenol, sodium salicylate, and methyl parahydroxybenzoate; and advantageously antioxidants to prevent development of rancidity in the unsaturated fatty acid and retard the oxidative drying of the unsaturated components as, for example, hindered phenol derivatives, diisopropyl phenol, 2-phenyl-2,6-ditertiary-butyl-4-methyl phenol and others; also humectants to prevent hardening, thus assisting in the facilitating in water removal, as, ethylene glycol and diethylene glycol and glycerol.

The general procedure of preparing my composition is as follows:

Wax, lube oil, terpene derivatives, fatty acid, and optionally chosen preservatives are mixed together and heated at about 170–180° F. The alkaline liquid or solution of the basic material is then added with stirring to saponify the mixture and disperse the oil. The emulsified mass is then heated to 195–205° F. or higher while stirring in water. Humectants, fungicides, and other additives are stirred in at this time. The mixture is allowed to cool gradually to room temperature. Pigments and thickeners are added in aqueous dispersions if necessary after the mixture has been cooled to 140° F.

The invention will be further illustrated by description in connection with the following specific example as a practice of it.

EXAMPLE 1

In this example all parts are by weight unless otherwise specified.

The following were placed in a reaction vessel and heated to 175° F.:

| | |
|---|---|
| Lube oil (100 S.U.S.) | 12.1 |
| Polymerized terpene hydrocarbon | 12.1 |
| Slack wax | 5.2 |
| Cotton seed fatty acid | 11.9 |
| 2,6-ditertiary-butyl-4-methyl phenol (antioxidant) | 0.01 |

A 46% aqueous solution of potassium hydroxide had previously been prepared, and 4.7 parts were added to the above mixture while stirring. After about 30 minutes, the mixture was heated to about 200° F. while about 45 parts of water were stirred in. After emulsification was complete in about 120 minutes, an additional amount of 46% aqueous solution of potassium hydroxide was added to produce a neutral soap. The amount added was about 1–3 additional parts, but varies with the acidity of the fatty acid and may be calculated by one skilled in the art. Diethylene glycol (4.7 parts) was added. The diethylene glycol functions not only as a humectant, but also promotes mutual solubility of the oil and the water phases. Fungicide (0.05 part of para-hydroxymethyl benzoate), and pigment (4.7 parts of TiO$_2$) are added to the cooling mixture. Thickeners such as 0.1 part of methoxy substituted cellulose having a degree of substitution of 1.64 to 1.92 in a predispersed aqueous slurry can be added after the temperature of the mixture cools to about 140° F.

The final cooled composition has the general appearance and consistency of commercial latex paints. This preparation was easily applied to the paint spray booth walls using conventional techniques. After normal use of the booth, the coating, including deposited spray paints was washed off the booth by directing a hose of hot water and steam against the material. Cold water under pressure can be used, if desired, although it has been found that hot water or steam is more efficient. The preparation is such that it may be removed by a stream of water, so that it may be said to be, in this regard, water soluble, this term being used to indicate that water will lessen its adhesive qualities sufficiently to effect its removal from the surfaces upon which it may be applied.

Having described the invention, what is claimed is:

1. An emulsion composition for forming a temporary coating on the inside surface of spray booths, said composition consisting essentially of:
   (A) hydrocarbon lube oil having a viscosity of about 40 S.U.S. up to about 1,000 S.U.S. at room temperature and present in an amount up to about 18 parts by weight;
   (B) polymerized terpene hydrocarbon formed of a mixture of alpha-pinene dimers and trimers and having a viscous liquid consistency at room temperature, said polymerized terpene hydrocarbon being present in an amount from 6 to 24 parts by weight;
   (C) slack wax present in an amount from 3 to 7 parts by weight;
   (D) a semidrying vegetable fatty acid present in an amount from 8 to 15 parts by weight; and
   (E) potassium or sodium hydroxide being a 46% by weight aqueous solution employed in an amount from 3 to 10 parts by weight.

2. The composition of claim 1 further including 3 to 15 parts by weight of humectant, from 3 to 10 parts by weight of pigment, from 0.01 to 0.1 part by weight preservative, from 0.005 to 0.1 part by weight antioxidant, and from 0.01 to 0.9 part by weight thickener.

3. The composition in claim 2 wherein the humectant is chosen from the group consisting of diethylene glycol, ethylene glycol and glycerol, the pigment is titanium dioxide, the preservative is para-hydroxymethyl benzoate, the thickener is methoxy substituted cellulose, and the antioxidant is 2,6-ditertiary-butyl-4-methylphenol.

4. The composition of claim 3 in which the diethylene glycol is employed in 3 to 15 parts, the para-hydroxymethyl benzoate is employed in 0.01 to 0.1 part, the methoxy substituted cellulose is employed in 0.01 to 0.9 part, and the 2,6-ditertiary-butyl-4-methyl phenol is employed in 0.005 to 0.1 part, all parts being by weight.

5. The composition of claim 1 wherein said polymerized terpene hydrocarbon has a softening point measured by ASTM ring and ball method E28–51T of about −10° C.

6. The composition of claim 1 wherein said lube oil has a viscosity of 100 S.U.S. at room temperature.

7. A composition for forming a temporary coating on the inside surface of spray booths consisting essentially of: up to 18 parts of lube oil, 6–24 parts of polymerized terpene hydrocarbon, 3–7 parts of slack wax, 8–15 parts of cotton seed fatty acid, 3–10 parts of a 46% by weight aqueous solution of potassium hydroxide, 3–15 parts of diethylene glycol, 0.01–0.1 part of para-hydroxymethyl benzoate, 0.01–0.9 part of methoxy substituted cellulose and 0.005–0.1 part of 2,6-ditertiary-butyl-4-methyl phenol, all parts being by weight.

References Cited

UNITED STATES PATENTS

| | | | |
|---|---|---|---|
| Re. 22,438 | 2/1944 | Corkery et al. | 260—28 |
| 2,275,659 | 3/1942 | Steinle et al. | 106—219 XR |
| 2,306,887 | 12/1942 | Klose | 106—2 |
| 2,976,163 | 3/1961 | Bitting et al. | 106—170 XR |
| 2,290,563 | 7/1942 | Kauppi | 106—173 |
| 2,563,499 | 8/1951 | Smith | 106—2 |

OTHER REFERENCES

Piccolyte Resins, Pennsylvania Industrial Chemical Corp., Technical Bulletin, Cover, and pp. 2, 3, 6, and 7.

Varnish Constituents, Chatfield, Leonard Hall Ltd., London, 1953, p. 86.

Bennet, "Concise Chemical and Technical Dictionary," Chemical Publishing Co., 1962, p. 614.

Paist, "Cellulosis" Reinhold, 1958, p. 214.

Kirk-Othmer, "Encyclopedia of Chemical Technology," 2nd ed., Interscience, vol. 2, p. 593.

WILLIAM H. SHORT, Primary Examiner.

E. NIELSEN, Assistant Examiner.

U.S. Cl. X.R.

106—171, 174; 260—675.5